United States Patent
Durham et al.

(10) Patent No.: US 10,152,430 B2
(45) Date of Patent: *Dec. 11, 2018

(54) CRYPTOGRAPHIC POINTER ADDRESS ENCODING

(71) Applicant: Intel Corporation, Santa Clara, CA (US)

(72) Inventors: David M. Durham, Beaverton, OR (US); Baiju Patel, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/727,810

(22) Filed: Oct. 9, 2017

(65) Prior Publication Data

US 2018/0101484 A1    Apr. 12, 2018

Related U.S. Application Data

(63) Continuation of application No. 15/257,544, filed on Sep. 6, 2016, now Pat. No. 9,811,479, which is a continuation of application No. 14/498,540, filed on Sep. 26, 2014, now Pat. No. 9,436,847.

(51) Int. Cl.
| | |
|---|---|
| G06F 12/14 | (2006.01) |
| G06F 21/72 | (2013.01) |
| G06F 21/55 | (2013.01) |
| H04L 29/06 | (2006.01) |

(52) U.S. Cl.
CPC ........ *G06F 12/1408* (2013.01); *G06F 21/556* (2013.01); *G06F 21/72* (2013.01); *H04L 63/0435* (2013.01); *H04L 63/061* (2013.01); *H04L 63/1433* (2013.01); *G06F 2212/1052* (2013.01); *G06F 2221/034* (2013.01); *G06F 2221/2107* (2013.01)

(58) Field of Classification Search
CPC .... G06F 12/1408; G06F 21/556; G06F 21/72; G06F 2221/034; G06F 2221/2107; G06F 2212/1052; H04L 63/0435; H04L 63/061; H04L 63/1433
USPC .......................................... 726/27; 713/171
See application file for complete search history.

(56) References Cited

U.S. PATENT DOCUMENTS

| | | | | |
|---|---|---|---|---|
| 4,047,245 A * | 9/1977 | Knipper | ............ | G06F 9/35 711/202 |
| 5,197,140 A * | 3/1993 | Balmer | ............ | G06F 9/30036 708/518 |
| 5,526,501 A * | 6/1996 | Shams | ............ | G06F 15/8007 711/217 |
| 5,630,088 A * | 5/1997 | Gupta | ............ | G06F 12/1036 711/207 |
| 2006/0126843 A1* | 6/2006 | Brickell | ............ | H04L 9/0637 380/260 |
| 2007/0174586 A1* | 7/2007 | Tell | ............ | G06F 1/10 712/1 |

(Continued)

*Primary Examiner* — Kambiz Zand
*Assistant Examiner* — Benjamin A Kaplan
(74) *Attorney, Agent, or Firm* — Barnes & Thornburg LLP

(57) ABSTRACT

A computing device includes technologies for securing indirect addresses (e.g., pointers) that are used by a processor to perform memory access (e.g., read/write/execute) operations. The computing device encodes the indirect address using metadata and a cryptographic algorithm. The metadata may be stored in an unused portion of the indirect address.

20 Claims, 5 Drawing Sheets

(56) References Cited

U.S. PATENT DOCUMENTS

| | | | |
|---|---|---|---|
| 2014/0244973 A1* | 8/2014 | Vorbach | G06F 9/30047 |
| | | | 712/29 |
| 2015/0234750 A1* | 8/2015 | Lu | G06F 12/1408 |
| | | | 713/193 |

* cited by examiner

CRYPTOGRAPHIC POINTER ADDRESS ENCODING

CROSS-REFERENCE TO RELATED APPLICATIONS

This application is a continuation application of U.S. application Ser. No. 15/257,544, entitled "CRYPTOGRAPHIC PONTER ADDRESS ENCODING," which was filed on Sep. 6, 2016 and which is a continuation application of U.S. application Ser. No. 14/498,540, entitled "CRYPTOGRAPHIC PONTER ADDRESS ENCODING," which was filed on Sep. 26, 2014 and which issued as U.S. Pat. No. 9,436,847 on Sep. 6, 2016.

BACKGROUND

When a software application runs on a computing device, a processor executes machine-level instructions into which high level programming code of the application has been translated (e.g., by a compiler and/or an interpreter, etc.). The pre-defined set of machine-level instructions that a particular processor can execute is the processor's instruction set. The processor typically fetches the machine-level instructions corresponding to the functionality of a software application from memory and then executes the instructions.

During execution of a software application, the operating system may allocate memory to an executing process using a memory allocation mechanism. The "malloc" function in the C programming language is an example of a memory allocation mechanism. Malloc and similar memory allocation mechanisms allocate an amount of memory (e.g., a block, where the size of the block is specified as an argument), and return a pointer that points to the beginning of the allocated memory (e.g., the pointer points to the beginning of the allocated block).

The processor's instruction set includes instructions, such as "MOV" instructions, that read and write to memory, or execute code, using an indirect address. An indirect address contains the address of another memory location, rather than an actual data value or executable code. A register used as a pointer is an example of an indirect address. Other examples include return addresses and instruction pointers.

A buffer overflow occurs when a computer program attempts to write more data to a buffer than the size of the buffer allows. When this occurs, the data is written to memory outside the buffer. A buffer overflow can occur as a result of a bug in the computer program. For example, a buffer overflow may occur when a computer program calculates a value that is larger than the size of its storage location, if the program does not perform range checking (e.g., a check to make sure a data value is within a specified range).

Buffer overflow attacks are a category of computer security exploits that allow an attacker to insert malicious code into a computer program, in order to alter the behavior of the program to, for example, cause a security breach or crash the program. Many zero-day cyber-attacks use buffer overflows. An example of a buffer overflow attack is the Heartbleed security bug, which exposed vulnerabilities in some versions of the OpenSSL cryptographic software library. This attack was designed to compromise security keys so as to expose sensitive information such as user names and passwords.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
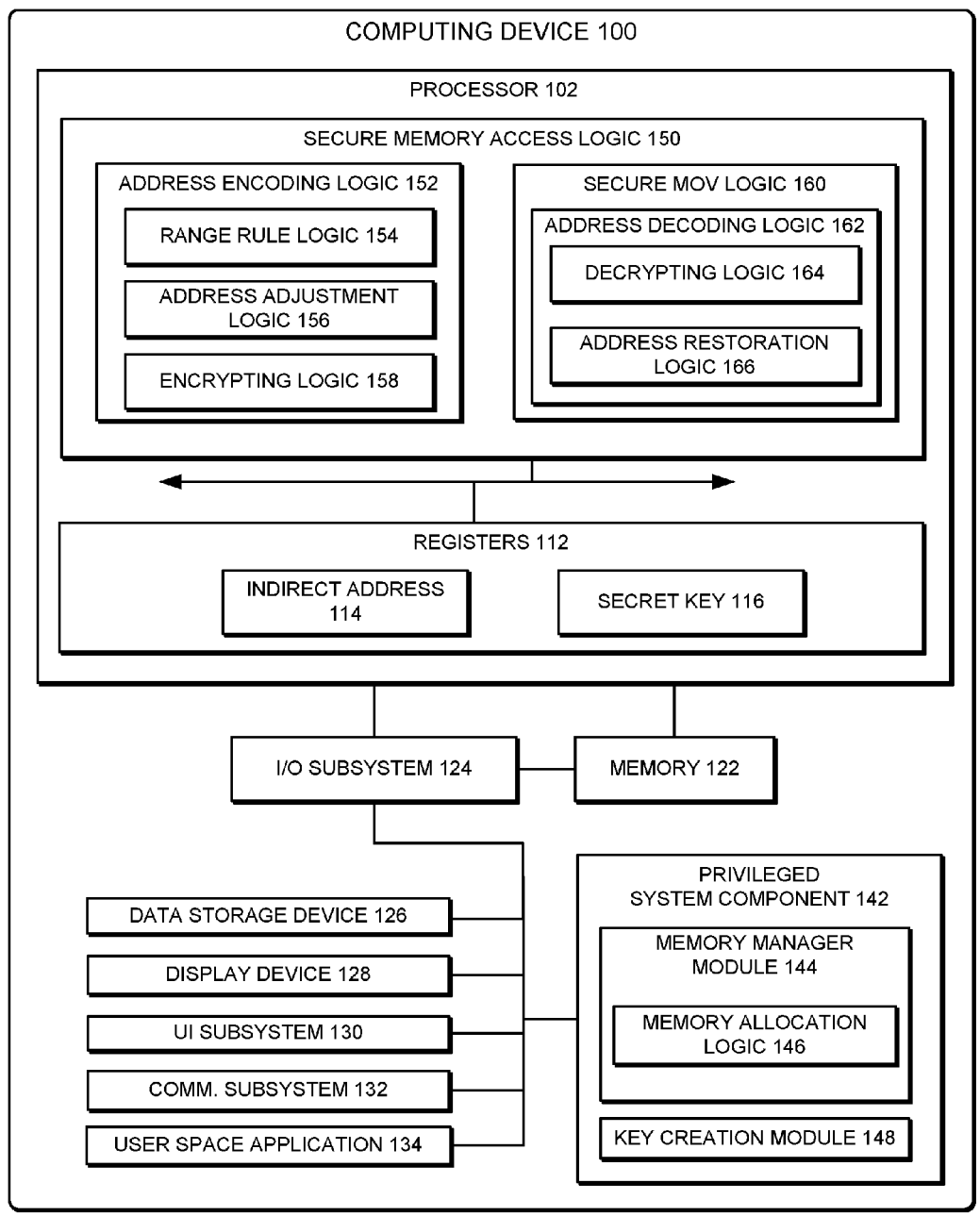
FIG. 1 is a simplified block diagram of at least one embodiment of a computing device configured with secure memory access logic as disclosed herein.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an embodiment of a computing device 100 includes a processor 102 having a set of secure memory access logic 150 and a number of registers 112. The secure memory access logic 150 utilizes metadata about an indirect address 114, which is encoded into unused bits of the indirect address 114 (e.g., non-canonical bits of a 64-bit address, or a range of addresses set aside, e.g., by the operating system, such that the corresponding high order bits of the address range may be used to store the metadata), in order to secure and/or provide access control to memory locations pointed to by the indirect address 114. For example, the metadata encoding and decoding provided by the secure memory access logic 150 can prevent the indirect address 114 from being manipulated to cause a buffer overflow, and/or can prevent program code from accessing memory that it does not have permission to access. Address encoding logic 152 of the secure memory access logic 150 is invoked when memory is allocated (e.g., by an operating system, in the heap) and provided to executing programs in any of a number of different ways, including by using a function such as malloc, alloc, or new; or implicitly via the loader, or statically allocating memory by the compiler, etc.). As a result, the indirect address 114, which points to the allocated memory, is encoded with the address metadata.

The address metadata can include valid range metadata. The valid range metadata allows executing programs to manipulate the value of the indirect address 114 within a valid range, but will corrupt the indirect address 114 if the memory is accessed using the indirect address 114 beyond the valid range. Alternatively or in addition, the valid range metadata can be used to identify a valid code range, e.g., a range of memory that program code is permitted to access (e.g. the encoded range information can be used to set explicit ranges on registers). Other information that can be encoded in the address metadata includes access restrictions on the indirect address 114 (e.g., whether the indirect address 114 can be used to write, execute, or only read the referenced memory). Address decoding logic 162 verifies the encoded metadata on memory read and write operations that utilize processor instructions such as MOV, where a general purpose register is used as a memory address to read a value from memory or to write a value to memory (e.g., load/store), as well as on other operations that involve the "use" of memory (such as control transfer instructions, e.g. CALL/JMP etc.). The illustrative secure memory access logic 150 is embodied as part of processor instructions (e.g., in hardware, as part of the processor instruction set architecture), or microcode (e.g., instructions that are stored in read-only memory and executed directly by the processor 102). In other embodiments, portions of the secure memory access logic 150 may be embodied as hardware, firmware, software, or a combination thereof (e.g., as programming code executed by a privileged system component 142 of the computing device 100). For example, the secure memory access logic 150 may be embodied in software as an instruction set emulator (e.g., a binary instrumentation tool such as a PIN Tool) that emulates the instruction logic utilizing the encoded addresses as disclosed herein.

The secure memory access logic 150 is executable by the computing device 100 to provide security for indirect addresses "inline," e.g., during execution of a program (such as a user space software application) by the computing device 100. As used herein, "indirect address" may refer to, among other things, an address of a memory location at which other data or instructions are stored, e.g., a register acting as a pointer. As such, the indirect address 114 may be embodied as, for example, a data pointer (which refers to a location of data), a code pointer (which refers to a location of executable code), an instruction pointer, or a stack pointer. Indirect addresses may be referred to by other terminology, such as "pointer," "address pointer," or "pointer address." As used herein, "metadata" may refer to, among other things, information about or relating to an indirect address 114, such as a valid data range, a valid code range, pointer access permissions, etc. As used herein, "memory access instruction" may refer to, among other things, a "MOV" instruction or any other instruction that causes data to be copied from one storage location to another, e.g., to and from memory and registers (where "memory" may refer to main memory or cache, e.g., a form of random access memory, and "register" may refer to a processor register, e.g., hardware), or any instruction that accesses or manipulates memory. However, the indirect address encoding/decoding technology disclosed herein is not limited to MOV or load/store instructions. For example, position independent code (PIC) programs may utilize indirect jump ("JMP") instructions and/or call instructions based on instruction pointer (e.g., program counter) relative addressing. Accordingly, control transfer instructions such as call and jump instructions can be adapted to handle encoded indirect addresses in a similar manner as described herein with respect to MOV instructions, wherein code is to execute within a valid address range. Likewise, the instruction pointer (e.g., register) may be range bound given the encoded address specified by the control transfer instruction (e.g. JMP/CALL) results in an encoded address being used for the instruction pointer, thus restricting valid program execution to within a valid address range (effectively, the program counter can increment correctly until it reaches the end of a the encoded range). Further, it should be noted that while the illustrative embodiments refer to "instructions," such instructions may be embodied as, e.g., processor instructions, operating system routines, or other forms of computer program code.

The illustrative secure memory access logic 150 includes address encoding logic 152 (which includes range rule logic 154, address adjustment logic 156, and encrypting logic 158), and address decoding logic 162, which includes decrypting logic 164 and address restoration logic 166. Illustratively, the address decoding logic 162 is embodied in secure mov logic 160, but may be embodied in other processor instructions as noted above, or as a separate instruction or series of instructions, or as higher-level code executed by a privileged system component such as an operating system kernel or virtual machine monitor, or as an instruction set emulator. As described in more detail below, the address encoding logic 152 and the address decoding logic 162 each operate on an indirect address 114 using metadata (e.g., valid range and/or permission metadata) and a secret key 116, in order to secure the indirect address 114 at the memory allocation/access level.

The illustrative indirect address 114 is embodied as a register 112 (e.g., a general purpose register of the processor 102). The illustrative secret key 116 is generated by a key creation module 148 of a privileged system component 142, and stored in one of the registers 112 (e.g., a special purpose register or machine specific register (MSR)), or another memory location that is readable by the processor 102. In some embodiments, the secret key 116 may be stored in a location that is readable only by the processor. In other embodiments, the secret key 116 used to secure indirect addresses can be stored in another memory location, such as in firmware, in a secure portion of the data storage device 126 or another data storage device, or another form of memory suitable for performing the functions described herein. In some embodiments, the secret key 116 may be transmitted across a secure communications channel and restored by an executive (such as an operating system or a virtual machine monitor, e.g., the privileged system component 142 described below). In virtualized environments in which virtual machines are migrated from one machine to another, and/or in cases in which a virtual machine, process or program running on the computing device 100 begins a sleeping/hibernating mode after an indirect address is secured using the secret key 116, and then later resumes, the secret key 116 will need to be recovered and restored. In these cases, the secret key 116 can be stored or possibly transmitted across a (secure) communications channel prior to a sleeping/hibernating mode, and then retrieved/restored by an executive (such as an operating system or a virtual machine monitor, e.g., the privileged system component 142).

On (or during) a memory allocation operation (e.g., a "malloc"), memory allocation logic 146 allocates a range of memory for a buffer and returns the indirect address 114 and the metadata (e.g., range and/or permission metadata). For example, the memory allocation logic 146 may encode plaintext range information in the indirect address 114 (e.g., in the unused/non-canonical bits, prior to encryption), or supply the metadata as one or more separate parameters to the instruction, where the parameter(s) specify the range and/or code permission information. Illustratively, the memory allocation logic 146 is embodied in a memory manager module 144 of the privileged system component 142. The memory allocation logic 146 initiates the address encoding logic 152. The address encoding logic 152 includes range rule logic 154 and address adjustment logic 156, which encode the indirect address 114 with the metadata (e.g., range and/or permission metadata) and an "adjustment," as described below. The address encoding logic 152 stores the metadata in an unused portion of the indirect address 114 (e.g., non-canonical bits of a 64-bit address).

To determine valid range metadata, the illustrative range rule logic 154 selects the valid range metadata to indicate an upper limit for the size of the buffer referenced by the indirect address 114. The address adjustment logic 156 adjusts the valid range metadata as needed so that the upper address bits (e.g., most significant bits) of the addresses in the address range do not change as long as the indirect address 114 refers to a memory location that is within the valid range indicated by the range metadata. This enables the indirect address 114 to be manipulated (e.g., by software performing arithmetic operations, etc.) but only so long as the manipulations do not cause the indirect address 114 to go outside the valid range (e.g., overflow the buffer).

The address encoding logic 152 uses the valid range metadata to select a portion of the indirect address 114 to be encrypted. The encrypting logic 158 encrypts the selected portion of the indirect address 114 (and the adjustment, in some embodiments), using the secret key 116 and a tweak, as described further below. On a memory access operation (e.g., a read, write, or execute operation), the address decoding logic 162 decodes the previously-encoded indirect address 114. To do this, the decrypting logic 164 decrypts the encrypted portion of the indirect address 114 (and in some embodiments, the encrypted adjustment) using the secret key 116 and the tweak, as described further below.

The address restoration logic 166 returns the indirect address 114 to its original (e.g., canonical) form, in order to restore the original value of the indirect address 114 (e.g., the true, original linear memory address). To do this, the address restoration logic 166 may remove the valid range metadata encoded in the unused bits of the indirect address 114, e.g., return the unused bits to their original form). If the indirect address 114 decodes successfully, the memory access operation completes successfully. However, if the encoded indirect address 114 has been manipulated (e.g., by software) so that its value falls outside the valid range indicated by the range metadata (e.g., overflows the buffer), the indirect address 114 will be corrupted as a result of the decrypting process performed by the decrypting logic 164. A corrupted indirect address will raise a fault (e.g., a general protection fault). In this way, the secure memory access logic 150 enables the computing device 100 to provide indirect address security against buffer overflow attacks and similar exploits. Embodiments of the indirect address security technologies disclosed herein can also be used for software debugging purposes or as an access control mechanism to prevent software from accessing areas of memory for which the software does not have permission. Additionally, in comparison to other buffer overflow mitigation techniques, embodiments of the disclosed indirect address security technologies can operate without any additional memory reads/writes, or without any additional instructions, or without any binary modifications, or without the need to recompile legacy code. Moreover, embodiments of the disclosed technologies are responsive to adversaries that can read memory and overwrite pointer values, as well as adversaries that can create/select arbitrary pointer values. Further, embodiments of the disclosed technologies can scale from very small memory ranges to very large memory ranges, or can cascade memory ranges within other memory ranges by using different encoded pointers. Still further, embodiments of the disclosed technologies are effective with dynamic memory allocation (e.g., due to the ability to programmatically create range encoded pointers inline). Additionally, embodiments of the disclosed technologies can be extended to provide code block (code location) access controls to data. Further, embodiments of the disclosed technologies are compatible with 64-bit versions of the ×86 instruction set, as well as ARM, MIPS, PowerPC and other processor architectures, including wider (e.g., greater than 64-bit) address bit architectures and smaller (e.g. 32-bit) architectures by reserving address ranges for the metadata containing addresses.

Some embodiments of the disclosed technologies utilize aspects of the address adjustment logic 156 and the address restoration logic 166 to support legacy code compatibility, as described below. As used herein, "legacy code" may refer to a version of computer code that was designed to work on an earlier, or now-obsolete, or no-longer-supported computer architecture. For example, legacy code may include software that was originally developed for a 32-bit processor, but which is now running on a 64-bit processor.

Referring now in more detail to FIG. 1, the computing device 100 may be embodied as any type of electronic device for performing the functions described herein. For example, the computing device 100 may be embodied as, without limitation, a smart phone, a tablet computer, a wearable computing device, a laptop computer, a notebook computer, a mobile computing device, a cellular telephone, a handset, a messaging device, a vehicle telematics device, a server computer, a workstation, a distributed computing system, a multiprocessor system, a consumer electronic device, and/or any other computing device configured to perform the functions described herein. As shown in FIG. 1, the illustrative computing device 100 includes at least one processor 102 embodied with the secure memory access logic 150.

The computing device 100 also includes memory 122, an input/output subsystem 124, a data storage device 126, a display device 128, a user interface (UI) subsystem 130, a communication subsystem 132, at least one user space application 134, and the privileged system component 142 (which, illustratively, includes the memory manager module 144 and the key creation module 148). The computing device 100 may include other or additional components, such as those commonly found in a mobile and/or stationary computers (e.g., various sensors and input/output devices), in other embodiments. Additionally, in some embodiments, one or more of the illustrative components may be incorporated in, or otherwise form a portion of, another component. Each of the components of the computing device 100 may be embodied as software, firmware, hardware, or a combination of software and hardware.

The processor 102 may be embodied as any type of processor capable of performing the functions described herein. For example, the processor 102 may be embodied as a multi-core processor or other multiple-CPU processor or processing/controlling circuit. The processor 102 has a number of registers 112, which include general purpose registers and special purpose registers. The indirect address 114 and the secret key 116 are stored in registers 112. The memory 122 of the computing device 100 may be embodied as any type of volatile or non-volatile memory or data storage capable of performing the functions described herein. In operation, the memory 122 may store various data and software used during operation of the computing device 100, as well as operating systems, applications, programs, libraries, and drivers.

The memory 122 is communicatively coupled to the processor 102, e.g., via the I/O subsystem 124. The I/O subsystem 124 may be embodied as circuitry and/or components to facilitate input/output operations with the processor 102, the memory 122, and other components of the computing device 100. For example, the I/O subsystem 124 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with the processor 102, the memory 122, and/or other components of the computing device 100, on a single integrated circuit chip.

The data storage device 126 may be embodied as any type of physical device or devices configured for short-term or long-term storage of data such as, for example, memory devices and circuits, memory cards, hard disk drives, solid-state drives, flash memory or other read-only memory, memory devices that are combinations of read-only memory and random access memory, or other data storage devices.

The display device 128 may be embodied as any type of display capable of displaying digital information such as a liquid crystal display (LCD), a light emitting diode (LED), a plasma display, a cathode ray tube (CRT), or other type of display device. In some embodiments, the display device 128 may be coupled to a touch screen or other human computer interface device to allow user interaction with the computing device 100. The display device 128 may be part of the user interface (UI) subsystem 130. The user interface subsystem 130 may include a number of additional devices to facilitate user interaction with the computing device 100, including physical or virtual control buttons or keys, a microphone, a speaker, a unidirectional or bidirectional still and/or video camera, and/or others. The user interface subsystem 130 may also include devices, such as motion sensors, proximity sensors, and eye tracking devices, which may be configured to detect, capture, and process various other forms of human interactions involving the computing device 100.

The computing device 100 further includes a communication subsystem 132, which may be embodied as any communication circuit, device, or collection thereof, capable of enabling communications between the computing device 100 and other electronic devices. The communication subsystem 132 may be configured to use any one or more communication technology (e.g., wireless or wired communications) and associated protocols (e.g., Ethernet, Bluetooth®, Wi-Fi®, WiMAX, 3G/LTE, etc.) to effect such communication. The communication subsystem 132 may be embodied as a network adapter, including a wireless network adapter.

The illustrative computing device 100 also includes a number of computer program components, such as the user space application 134 and the privileged system component 142. The user space application 134 may be embodied as any computer application (e.g., software, firmware, hardware, or a combination thereof) that interacts directly or indirectly with an end user via, for example, the display device 128 or the UI subsystem 130. Some examples of user space applications 134 include word processing programs, document viewers/readers, web browsers, electronic mail programs, messaging services, computer games, camera and video applications, etc. Among other things, the privileged system component 142 facilitates the communication between the user space applications 134 and the hardware components of the computing device 100. Portions of the privileged system component 142 may be embodied as any operating system capable of performing the functions described herein, such as a version of WINDOWS by Microsoft Corporation, ANDROID by Google, Inc., and/or others. Alternatively or in addition, portion of the privileged system component 142 may be embodied as any type of virtual machine monitor capable of performing the functions described herein (e.g., a type I or type II hypervisor).

The illustrative privileged system component 142 includes a number of computer program components, such as the memory manager module 144 and the key creation module 148. Each of the components of the privileged system component 142 may be embodied as software, firmware, hardware, or a combination of software and hardware. For example, the components of the privileged system component 142 may be embodied as modules of an operating system kernel, a virtual machine monitor, or a hypervisor. The memory manager module 144 allocates portions of memory 122 to the various processes running on the computing device 100 (e.g., as ranges of virtual memory addresses). The memory manager module 144 is embodied as, for example, a loader, a memory manager service, or a heap management service. The key creation module 148 creates the secret key 116 and writes it to a register to which the processor 102 has read access (e.g., a special purpose register). To create the secret key 116, the key creation module 148 may execute, for example, a random number generator or another algorithm capable of generating a secret key that can perform the functions described herein.

Figure 2:
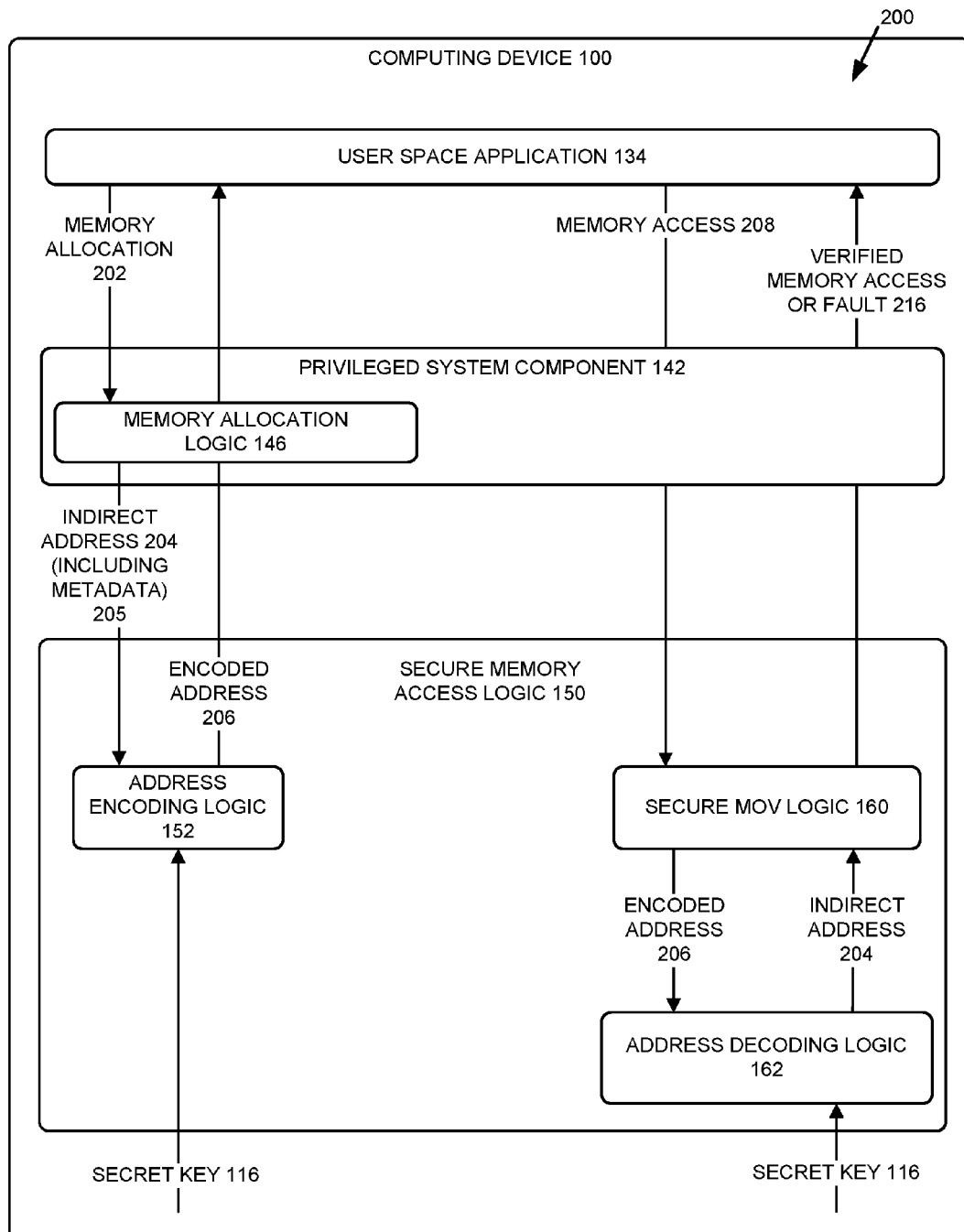
FIG. 2 is a simplified environment diagram of the computing device of FIG. 1, illustrating an application of the secure memory access logic of FIG. 1.

Referring now to FIG. 2, in some embodiments, the computing device 100 establishes an environment 200 during operation (e.g., native and/or virtual runtime or "execution" environments). The various modules depicted in the environment 200 may be embodied as hardware, firmware, software, or a combination thereof. In the environment 200, the user space application 134 (or the privileged system component 142, e.g., in loading a user space application 134) may, from time to time, during the operation of the computing device 100, issue a memory allocation 202. The memory allocation 202 may be translated (e.g., compiled or interpreted), as needed, by the memory allocation logic 146 of the privileged system component 142 before being passed on to the processor 102. In the processor 102, the address encoding logic 152 is executed in response to the memory allocation 202 (e.g., in place of a conventional "malloc" instruction). Whereas a conventional malloc instruction simply allocates memory and returns an (unsecured) pointer, the address encoding logic 152 encodes the indirect address 204, including metadata 205 (e.g., the range and/or permission information, either already plaintext encoded in the indirect address—without encryption yet applied by the processor—or as a separate parameter to the instruction specifying the range), as described herein, and returns an encoded indirect address 206.

Similarly, the user space application 134 or the privileged system component 142 may issue a memory access 208 from time to time, which may be handled by the processor 102 as a processor instruction that reads from memory 122 and writes to a register 112 or reads from a register 112 and writes to memory 122, using an indirect address 114 (e.g. a MOV instruction). Using the MOV instruction as an example, the secure mov logic 160 performs the memory access only after successfully executing the address decoding logic 162. While the secure mov logic 160 and the address decoding logic 162 are shown as separate modules in FIG. 2, it should be understood that the address decoding logic 162 can be incorporated into the secure mov logic 160 or can be embodied as a separate set of instructions. Further, it should be understood that the address decoding logic 162 can be incorporated into or referenced by other types of instructions, alternatively or in addition to the MOV instructions (e.g., call, JMP, etc.). For example, control transfer instructions such as call and JMP can load the encoded pointer address for the code to execute into the processor's program counter register (e.g. instruction pointer) (e.g., the RIP, where RIP is the instruction pointer register using instruction relative addressing in 64-bit code). The instruction pointer register can then be queried by a program and as a result, the current program counter address will be the encoded form (offset to the current program counter location).

If the address decoding logic 162 successfully decodes the encoded address 206, the original indirect address 204 is returned to the privileged system component 142 and the memory access is completed, or program execution begins at the new program counter location (in the case of control flow changes) (216). If the encoded address 206 does not successfully decode, a fault is raised (218).

Figure 3A:
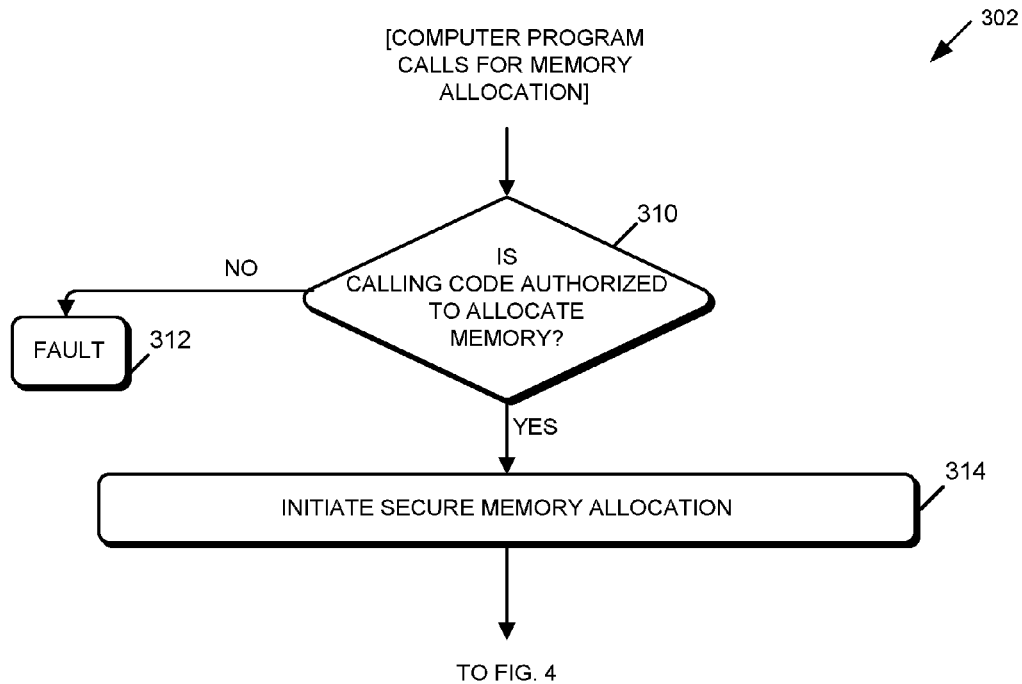
FIG. 3A is a simplified flow diagram of at least one embodiment of a method for initiating a memory allocation operation during execution of a computer program as disclosed herein, which may be executed by the computing device of FIG. 1.
Figure 3B:
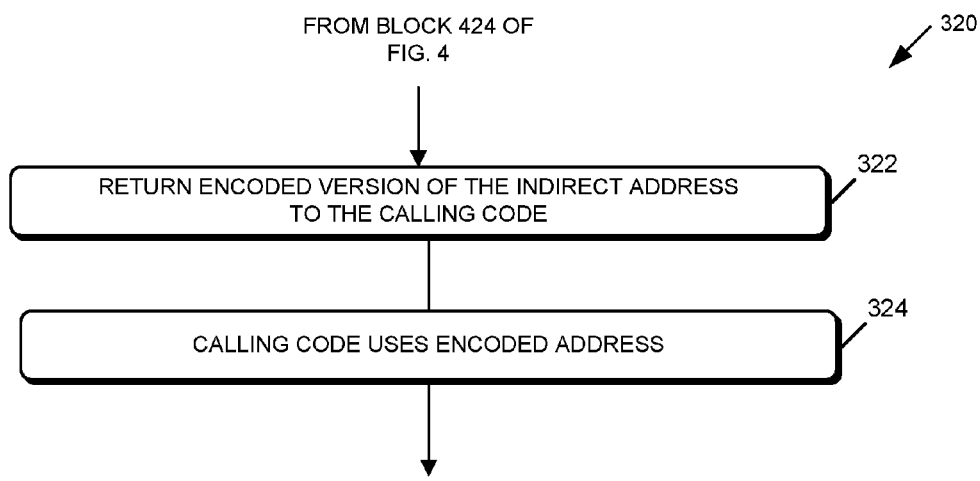
FIG. 3B is a simplified flow diagram of at least one embodiment of a method for continuing the memory allocation operation of FIG. 3A.

Referring now to FIGS. 3A and 3B, examples of methods 302 and 320 for performing a memory allocation process, are shown. Portions of the methods 302 and 320 may be executed by hardware, firmware, and/or software of the computing device 100 (e.g., by the privileged system component 142 executing the memory allocation logic 146). In FIG. 3A, the method 302 begins in response to a call for memory allocation from calling code (e.g., the privileged system component 142 or the user space application 134). In block 310, the computing device 100 determines whether the calling code is authorized to allocate memory. To do this, the computing device 100 may utilize a set of processor registers to log the locations of recently-taken code branches, e.g., the last branch record (LBR). For example, to determine the calling code (e.g., the code that called a function), the function can query the LBR to see the branch history. Alternatively, the function may query the call stack for the return address (but the return address on the stack may not be as secure as data stored in processor registers). If the computing device 100 determines that the calling code is not authorized to allocate memory, a fault is raised in block 312. If the computing device 100 determines that the calling code is authorized to allocate memory, the computing device 100 proceeds to block 314 and initiates secure memory allocation using the techniques disclosed herein. Accordingly, the computing device 100 proceeds from block 314 to the beginning of the method 400, shown in FIG. 4 and described below.

In FIG. 3B, the method 320 begins in response to the output of an encoded indirect address at block 424 the method 400. In block 322, the computing device 100 returns the encoded version of the indirect address (e.g., the encoded address 206) to the calling code that initiated the memory allocation in block 310 of FIG. 3A. In block 324, the calling code uses the encoded indirect address to access the allocated memory (e.g., buffer). In doing so, the calling code may alter or modify the encoded indirect address by, for example, performing arithmetic operations on the encoded indirect address. Thus, a subsequent read or write operation of the calling code may trigger the execution of the method of FIG. 5, described below.

Figure 4:
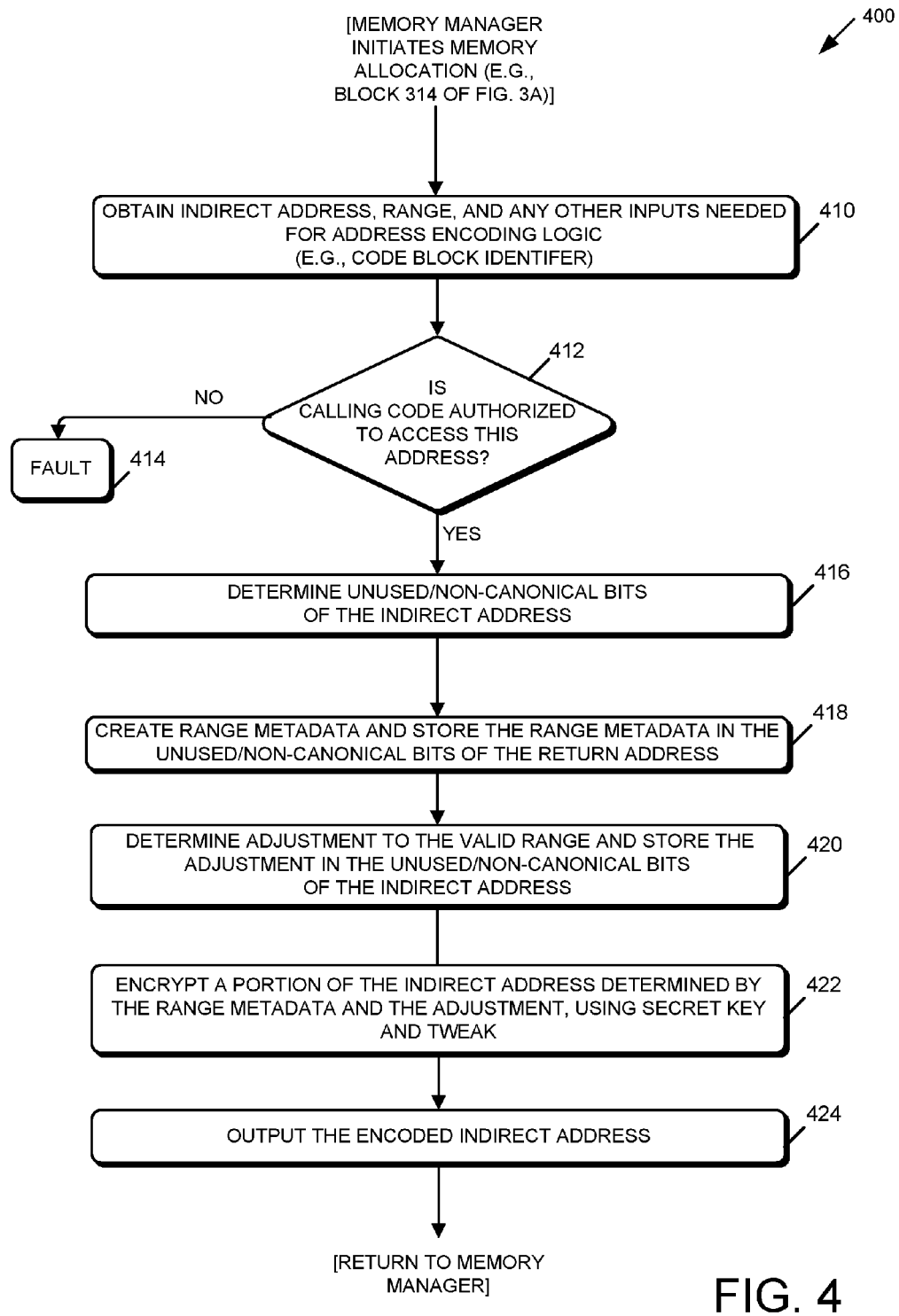
FIG. 4 is a simplified flow diagram of at least one embodiment of a method for providing security for an indirect address as disclosed herein, which may be executed by the computing device of FIG. 1.

Referring now to FIG. 4, an example of a method 400 for securing an indirect address is shown. Portions of the method 400 may be executed by hardware, firmware, and/or software of the computing device 100 (e.g., by the processor 102 executing the address encoding logic 152). The method 400 begins in response to a memory allocation (e.g., by the memory manager module 144 in block 314 of FIG. 3A). In block 410, the computing device 100 obtains the indirect address, address range, and other inputs needed to encode the indirect address (e.g., a code block identifier or instruction pointer, as described below). In block 412, the computing device 100 determines whether the calling code (e.g., the code initiating the memory allocation in block 310 of FIG. 3A) is authorized to access the indirect address received in block 410 (e.g., indirect address 204). To do this, the computing device 100 may perform an access control check by verifying the instruction pointer or caller privilege level information for the calling code, which may be obtained from, for example, a heap manager of the memory manager module 144. If the computing device 100 determines that the calling code is not authorized to access the indirect address, a fault is raised (414). If the computing device 100 determines that the calling code is authorized to access the indirect address, the computing device 100 proceeds to block 416. In block 416, the computing device 100 determines the unused (e.g., non-canonical) address bits of the indirect address to perform the address range encoding. To do this, the computing device 100 may simply use the higher (e.g., most significant) unused/non-canonical bits of the indirect address. It should be noted that the encoded addresses do not need to be architecturally non-canonical. Rather, the unused/non-canonical addresses can simply be a range of memory set aside by, for example, the privileged system component 142, to enable the address encoding as disclosed herein.

In block 418, the computing device 100 creates the metadata (e.g., valid range and/or permission data) and stores the metadata in the unused/non-canonical bits of the indirect address selected in block 416. Illustratively, the metadata indicates an upper limit on the size of the buffer pointed to by the indirect address. To create the metadata, the computing device 100 converts the indirect address values to a center location in which the most significant canonical address bits do not change for the valid memory range. In some embodiments, the range metadata includes an "exponent" to determine the 2's power of the memory range size. In some cases, an "adjustment" is used to force values to the end of the 2's power range as described below. In other embodiments, the adjustment may be used to force the buffer to the beginning of the 2's power range when buffer "underflow" needs to be addressed (as opposed to buffer "overflow"). Using the exponent metadata, any 2's power memory range can be defined (e.g., 2, 4, 8, 16 . . . 2^64).

The following is a simple example of range metadata encoding. The addresses 0000b-0011b fit the range 0-3 where the upper two bits do not change. However, if a pointer is modified to go to the index 4, one of the upper bits will change. Accordingly, the valid range metadata can be encoded as [2] (for the upper two bits to encode a range of 4) and the valid range metadata can be stored in the higher non-canonical bits, e.g., "[2] 00xxb." In this example, the exponent would be 2 bits in size (e.g., values [1-4]), to cover the 4 bit addresses used in the example. Table 1 below illustrates a number of additional, simplified examples.

TABLE 1

Address encoding examples.

| Real Address Range | Size | Encoded Address | Comment |
| --- | --- | --- | --- |
| 1001b-1100b | 4 bytes | [2] {3} 11xx | Adjust +3 to fit all in 11xxb |
| 1001b-1101b | 5 bytes | [3] {1} 1xxx | Adjust +1 to end of range |
| 1110b-1111b | 2 bytes | [1] {0} 111x | Fits in lowest power of 2 |
| 1101b-1110b | 2 bytes | [1] {1} 111x | Adjust +1 to fit all in 111xb |
| 0000b-1111b | 16 bytes | [4] {0} xxxx | Full range |
| 1010b-1010b | 1 byte | [0] {0} 1010 | Exact match |
| 1011b-1101b | 3 bytes | [2] {2} 11xx | Adjust +2 to end of range |

In Table 1, the encoded address is represented using a format that is similar to a floating point format. In the encoded addresses in the third column of Table 1, the number in brackets, e.g., [2], is the exponent or valid range metadata; the number in braces, e.g., {3}, is the adjustment value, and the address to the right of the adjustment value indicates the unused/non-canonical bits in which the valid range metadata and adjustment value are stored. In block 420, the computing device 100 determines the adjustment (or "offset") to be applied to the valid range, and stores the adjustment value in the unused/non-canonical bits of the indirect address. In some embodiments, the adjustment is used to force the encoded range to the end of a 2's power boundary. This sets a very specific upper bound on the buffer size. In this way, an encoded version of the original (not encoded) valid address range can be created. The encoded version can be designed such that the least number of upper bits will change over the valid range (e.g., so that encryption of the upper bits will detect/amplify modifications to the encoded address on decryption). The encoding is reversible, such that the original intended valid address range is returned as long as it is modified within the range. In the example above, the range 0-3 decimal (0000b-0011b binary) can be encoded as [2] {0} 00xxb (where "xx" means those bits can take any value for the range: 00, 01, 10, 11). In another example, the range 1-4 decimal (0001b-0100b) can be encoded as [2] {-1} 00xxb (where the adjustment is subtracted in order to keep the upper bits constant). Alternatively, the same range 1-4 decimal (0001b-0100b), can be encoded as [2] {3} 01xxb (this time adding an adjustment of 3 in order to keep the upper bits constant). With either representation, the encoded version decodes back to the original address range 1-4. In still another example, if the buffer size is 4 KB, a 10 bit adjustment value with a resolution of 4 bytes can be used.

Other embodiments may use a signed adjustment value (e.g., 2's compliment) where the buffer may be either adjusted to the beginning or end of the 2's power boundary depending on the sign (+/−) of the adjustment. Such embodiments can provide protection from either buffer overflow or underflow situations depending on the adjustment sign. In cases where 16 bits are available in unused/non-canonical addresses (e.g., in current 64-bit processors), 10 of the available bits can be used for the adjustment and the remaining 6 bits can be used for the valid range metadata (e.g., exponent value/2's power). If the exponent value reaches a range beyond a 4 KB page, the adjustment can expand by a 2's multiplier to allow adjustments of large buffers within even larger power of 2 ranges (noting that in some embodiments, 4096 bytes are fully covered with a 10-bit adjustment value allowing the adjustment to "adjust" a buffer to end with the very last 4 byte word in a 4 KB page before the upper (2's power) bits will change). Such an adjustment (e.g., incremented by 1) will adjust the buffer location 4 bytes at a time. Any other choice of initial adjustment size and word size is possible in other embodiments. In another example, if the exponent has a value of 13, then the adjustment value can be multiplied by 2 so that the adjustment can still encompass the full 2's power range (in this case, two 4 KB pages, if adjusting by 8 bytes at a time), and so on (e.g. an exponent value of 14 means the adjustment value is multiplied by 4, and an exponent value of 15 means the adjustment value is multiplied by 8 and so on, allowing the adjustment to encompass the full 2 powers range).

In block 422, the computing device 100 encrypts a portion of the indirect address, where the portion of the indirect address to be encrypted is determined by the valid range metadata (e.g., exponent/2's power) and the adjustment value. The valid range metadata determines the number of the most significant address bits of the encoded address that are to be encrypted (e.g., down to a minimum number so some address bits will always be encrypted). In some embodiments, the adjustment value is encrypted as well (e.g., to create a reasonable block size for a block cipher). In some embodiments, the most significant bits of the used bits/canonical address identified in the valid range metadata are encrypted with a secret key (e.g., the secret key 116), using the valid range metadata (which may or may not include the adjustment value) as a tweak. In the illustrated embodiments, the valid range metadata (e.g., exponent/2's power) would not be encrypted because the processor uses the valid range metadata plaintext to determine the number of bits to decrypt. However, the valid range metadata (e.g., exponent/two's power) can be used as a tweak in the case of a tweakable block cipher (and thereby affect the encrypted bits). Other data values that may be used as tweaks include: data stored in the unused bits of the indirect address, the upper limit on the buffer size, an exponent of a two's power boundary selected as the upper limit on the buffer size, an adjustment value applied to the two's power boundary, a code block identifier, instruction pointer data, permission information encoded in the metadata, and/or version number (useful when reassigning/revoking pointers that were previously assigned to a program, version may be maintained by the processor in a register).

As used herein, a "tweak" may refer to, among other things, a second input to a block cipher, in addition to the usual plaintext or ciphertext input and the key (e.g., the secret key 116). Encrypting the upper two canonical bits enables the computing device 100 to detect when the indirect address has been illegally changed, because the encryption algorithm will cause the illegally-changed upper bits to produce a random sequence of bits that are non-deterministic to an adversary, which likely results in a fault when the illegally-changed indirect address is used.

The portion of the indirect address to be encrypted (e.g., the upper used/canonical bits) is encrypted using a cipher mode encryption algorithm, such as a tweakable block cipher, using the valid range metadata and adjustment (e.g., [2] {−1}, in the above example) as a tweak. Some examples of tweakable block ciphers include: XOR-encrypt-XOR (XEX), Liskov, Rivest, and Wagner (LRW), and XEX-based tweaked-codebook mode with ciphertext stealing (XTS). Other bit diffusion methods in which any single bit change in the cipher text results in changes across the entire decrypted plaintext can be used. If desired, alternative embodiments can trade off security for performance by using non-cryptographic methods that still achieve reasonable bit diffusion analogous to a block cipher.

The cipher selected for the encryption can be implemented in hardware, using an algorithm that has a bit-selectable block size (e.g. SPECK), or an algorithm that allows a fixed block size with a tweak using the remaining unencrypted bits (e.g., the extra bits outside the fixed block size). In some embodiments, the cipher has sufficient bit diffusion so that any bit change made to the encrypted address bits will equally affect (cascade through) all bit positions when decrypted. This provides the basis for a corrupted address given any change or bounds violation. Using this method, if the adversary attempts to tamper with the metadata (e.g., the exponent or adjustment values, or the encrypted most significant bits) the resulting decoded address will be corrupted. In the 64-bit address space, address corruption will result in a fault with high probability, thus allowing the address corruption (and pointer access or bounds violation) to be caught by the privileged system component 142 (e.g., an operating system/executive/VMM/alternative mode/debug trace/management processor/subsystem, etc.).

In the example above, if the indirect address/pointer value is incremented beyond 3, modifying the indirect address/pointer in this way will corrupt the upper canonical bits and cause a non-deterministic memory access that cannot be controlled by an adversary. For instance, going beyond a buffer size by one byte will result in a random memory access that will page fault with high probability. This is due to the bit diffusion properties of the cipher to ensure that even one-bit changes will diffuse through all of the most significant bits. As a result of the adjustment, which forces values to the end of the 2's power range, buffer overflows cause corruption of the encrypted address bits.

The cipher tweak can be extended to include a code block identifier to provide access controls over which code blocks (e.g., blocks of the calling code) are permitted to use an indirect address/pointer to access memory. Additionally, instruction pointer (which may be referred to as the "program counter") information or ranges can be encoded as part of the pointer encryption tweak. The instruction pointer information can be used to limit the scope of what code can access what data. For example, all code can be arranged within fixed blocks of memory within the 64-bit address space. Code with similar access permissions can be grouped together in the same block or range. The tweak can include the identifier for the block of memory from which an instruction is executing. In this way, code and data can be associated, and access controlled, such that an adversary coming from a different code block will not be able to access data of the protected block using the encrypted pointers, because the encrypted pointers will not decode properly if the wrong code block identifier is used as a tweak. Further, when a block of code calls, e.g., malloc, to allocate memory to itself, malloc can return the encrypted address using the calling code's memory block to insure private access to the allocated memory (so long as the allocated memory isn't freed and then reallocated to another code block). Alternatively, other methods of identifying the calling code can be used in the tweak, such as protection keys. Still further, the metadata for read/write/execute access that is used by the processor 102 to control access to memory can be used as part of the tweak for the encrypted address bits. Additionally, the instruction pointer may itself be represented as an encoded pointer (e.g., range-based). In this case, the metadata and encrypted address bits can be used as part of the "tweak" identifying the code block accessing a data pointer or requesting a memory allocation/assignment.

Figure 5:
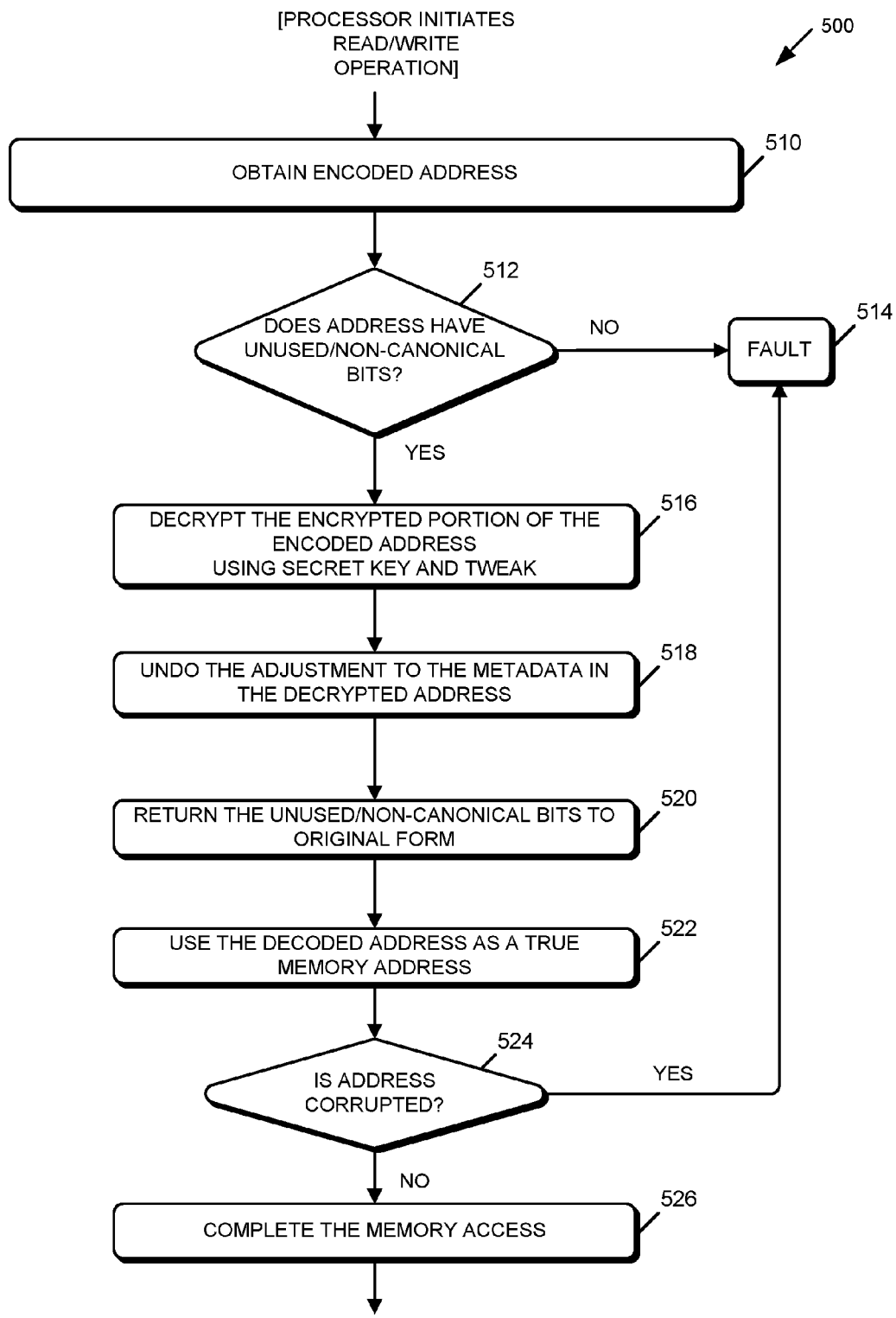
FIG. 5 is a simplified flow diagram of at least one embodiment of a method for verifying a previously secured indirect address as disclosed herein, which may be executed by the computing device of FIG. 1.

Referring now to FIG. 5, an example of a method 500 for decoding an indirect address is shown. Portions of the method 500 may be executed by hardware, firmware, and/or software of the computing device 100 (e.g., by the processor 102 executing the secure mov logic 160 and/or the address decoding logic 162). The method 500 begins in response to a memory access operation such as a read, write, or execute operation, e.g., a MOV instruction. Table 2 below provides some illustrative examples of MOV instructions that can use the address encoding technology disclosed herein. Of course, different processor architectures may refer to the "MOV" functionality by different names for the instructions or different options/parameters. As such, the disclosed embodiments apply to all types of "MOV" functionality across different architectures, irrespective of the terminology used to refer to such functionality. Further, the MOV instruction is one example, and any instruction that can direction access memory to read/write data can apply the address encoding and decoding methods disclosed herein.

TABLE 2

Example MOV instructions.

| Instruction | Explanation |
| --- | --- |
| MOV eax, [ebx] | Move the 4 bytes in memory at the encoded address contained in EBX into EAX |
| MOV [var], ebx | Move the contents of EBX into the 4 bytes at encoded memory address var. (var is a constant). |
| MOV eax, [esi − 4] | Move 4 bytes at encoded memory address ESI + (−4) into EAX (note, this will corrupt address if goes out of bounds) |
| MOV [esi + eax], cl | Move the contents of CL into the byte at encoded address ESI + EAX (one is base address, one offset. Pointers can be computed as long as stay in bounds) |
| MOV edx, [esi + 4 * ebx] | Move the 4 bytes of data at encoded address ESI + 4 * EBX into EDX (EBX is an offset, address will become corrupted if EBX goes out of bounds) |
| MOV BYTE PTR [ebx], 2 | Move 2 into the single byte at the encoded address stored in EBX. |
| MOV WORD PTR [ebx], 2 | Move the 16-bit integer representation of 2 into the 2 bytes starting at the encoded address in EBX. |
| MOV DWORD PTR [ebx], 2 | Move the 32-bit integer representation of 2 into the 4 bytes starting at the encoded address in EBX. |
| MOV QWORD PTR [rbp + 4F0h], rax | Move 64-bit integer at RBP + offset |
| MOV rax, [rbx] | Moves 8 bytes beginning at rbx into rax |
| MOV rax, [addr] | Instruction moves 8 bytes beginning at addr + rip to rax (this is 32-bit instruction pointer relative addressing, here addr needs to be properly encoded or instruction pointer needs to be encoded |

In block 510, the computing device 100 obtains the encoded indirect address (e.g., the encoded address 206, which may be obtained from a register 112). In block 512, the computing device 100 determines whether the encoded address obtained in block 510 has unused or non-canonical bits. If the computing device 100 determines that the encoded address does not have unused/non-canonical bit (e.g., the address doesn't fall within the non-canonical, or otherwise reserved, range of addresses, whether the address range is 32-bit, 64-bit, 128-bit or whatever range an alternate architecture may require), a fault is raised (514). If the computing device 100 determines that the encoded address has unused/non-canonical bits (e.g., the address falls with the canonical or reserved address range), the computing device 100 proceeds to block 516. In block 516, the computing device 100 decrypts the encrypted portion of the encoded address, using the decryption algorithm counterpart of the encryption algorithm used in block 422 of FIG. 4, and using the same secret key and tweak as used by the encryption algorithm in block 422 of FIG. 4. In block 518, the computing device 100 "undos" the adjustment to the range metadata in the decrypted address (e.g., by subtracting the decrypted adjustment value in the unused/non-canonical bits from the full decrypted value of the indirect address). In block 530, the computing device 100 returns the decrypted indirect address to its original (e.g., canonical) form by, for example, removing the unused/non-canonical bits. In block 522, the computing device 100 uses the decoded address output by block 520 as a "true" (e.g., virtual or linear) memory address (e.g., as a pointer). In block 524, the computing device 100 determines whether the decoded address used as a memory address/pointer at block 522 is a corrupted address. If the decoded address is corrupted, a fault is raised (514). If the decoded address is not corrupted, the computing device 100 completes the memory access operation successfully, using the decoded address as a memory address/pointer, in block 526. In this way, the method 500 allows the computing device 100 to verify the range-encoded indirect address and enforce the embedded range check before converting the range-encoded address into a real memory address. Additionally, invalid adjustment values (e.g., adjustment values that go beyond the 2's power range), can be used to determine with some probability when a corruption occurs as well as invalid address values or metadata reserved to detect when corruption occurs. Even if corruption is not detected, the resulting address would not be deterministic (and therefore usable) to an adversary. In addition to the buffer overflow mitigation techniques described above, there are other applications of the pointer address encoding technologies disclosed herein. For example, processor instructions can be restricted by privilege level or caller location authorization (e.g., an instruction pointer block or range of a heap manager). Additional instructions can be added in cases in which the program code itself can control its own pointers and ranges. These instructions may use a larger encoded pointer range as input, and may produce a smaller/equal range pointer (more restrictive) falling within the larger buffer's range if the code executing this instruction belongs to the code block that owns the original (superset) buffer pointer (which can be determined by the instruction pointer). For example, the memory manager module 144 can allocate the call stack and provide a large range pointer to the call stack (e.g., for the stack pointer). Code segments that are authorized to act on the call stack may then use this processor instruction to encode sub range pointers to buffers implicitly created on the stack. Compilers can automatically augment code to do this as stack operations are performed (local variables created, etc.), thus, protecting even individual data structures or individual variables on the stack. That is, the disclosed techniques enable encoding buffer sizes down to individual variable sizes (e.g., a 32-bit integer can be encoded as a pointer to a buffer of 4 bytes).

Similarly, code blocks that own a pointer can use similar instructions to transfer control/ownership to another/different code block by generating a newly encoded pointer for the target/receiving code block based on the original, e.g., by including selecting a smaller buffer size for assignment to another code block. Such an instruction would take as input parameters the resulting buffer size, the original data pointer and an encoded pointer for the targeted code range (that the pointer is being assigned). Such an instruction can decode the input encoded pointer using the instruction pointer of the calling code block as a tweak, reduce the range if the input range is smaller than the input encoded pointer, and use the input encoded pointer to the targeted code block/range as part of the tweak when producing the output encoded pointer (now accessible to the newly assigned code block for the extent of the specified range). Other input parameters could be, for example, additional metadata, such as read/write/execute permissions (possibly as a subset of the original) for the targeted code.

To provide access control, the instruction pointer, or an encoded instruction pointer comprising of a range identified with a similar exponent, adjustment and encrypted indirect address bits, can be used as part of the tweak. The instruction pointer can similarly be encoded as an executable range/buffer of memory where the program is stored. When used as a tweak for the data pointer (e.g., an indirect address 114), the instruction pointer can control access to data by different pieces of program code. Further, the encoded instruction pointer value can be queried by programs for RIP relative addressing. (e.g. the instruction pointer register can be read by a program and then used to call/jump to relative offsets within the program's valid range, or read/write data within the program's valid range by using the encoded instruction pointer value).

Additionally, data pointers may be created and converted by new processor instructions (or operating system routines), allowing ownership of a data pointer (e.g., an indirect address 114) to be extended to other code/program ranges. That is, the owner program/code of a data pointer (whose instruction pointer range was used as part of the tweak for the data pointer) can call, e.g., an operating system routine (or processor instruction) that will produce a new data pointer that can be used by another program/code range. In this case, the new instructions/operating system routine will decode the original data pointer that was encoded as described herein and re-encode the range using the new program/code range metadata as the tweak, thereby producing a data pointer that will decode properly when accessed from an instruction pointer operating in the new address range. The new instruction/routine may also take as a parameter a smaller range encoding, thereby allowing the program owning the original data pointer to subset the data buffer size to a smaller region of memory accessible by the new program/code range.

Further, a 64 bit-stack pointer can be encoded as described herein, and as such, should be updated accordingly by the processor 102 on stack pushes and pops, calls and returns conforming to the allocated range of the stack. After decoding a MOV instruction to the stack pointer, the processor 102 may choose to cache the decrypted version of the stack pointer for direct memory access efficiency, however, the processor 102 may continue to track the range condition to assure stack overflows do not occur.

With instruction pointer relative addressing, the program counter register can be read and used to calculate offsets for position independent code (PIC) and data. The instruction pointer can also be encoded such that legacy instruction pointer relative position independent code will still function correctly. In this case, the encoded instruction pointer register may have a range conforming to the extent of the relocated program code and data (including text sections) in memory. In addition to memory accesses, PIC programs may utilize indirect jumps (JMP) and calls based on RIP relative addressing. As such, the JMP and CALL instructions can be modified to handle encoded pointer addresses, converting them into the actual linear memory address similar to the MOV instruction. Instruction pointer relative jumps and calls outside of the pointer's bounds may result in a corrupted target address for the jump/call instruction, which is very likely caught with a fault. The loader can also fix relocatable symbol tables to properly encode the extent of the function pointers for their respective code sections and memory locations. This instruction pointer-range pointer can also be used as a flexible code block/identifier tweak to access control data pointers with their associated code. Additionally, encoded range pointers on the call stack can be encrypted to provide control flow integrity between calls and returns while retaining the range encoding when decrypted on returns Not all values of the 6 bit exponent metadata are actually used (e.g., with 64-bit addressing). For example, in 64-bit addressing, values that go beyond 48 will collide with the non-canonical bits and therefore will never be utilized. Thus, exponent values above 48/56 can be redefined to indicate that other interpretations of the adjustment region can be defined. This interpretation of the high order exponent values allows alternative uses of the unused/non-canonical address bits to coexist with the disclosed address encoding mechanisms. Other embodiments can use these undefined values to selectively determine if the adjustment data is or isn't present. For example, an exponent value beyond 48 can indicate no adjustment is present/needed for the buffer, and only the 2's power is valid, setting the 2's power back to the beginning without adjustments. This approach can enable better utilization of the address space by selectively determining what metadata is required for the encoded addresses, and selectively extending the available address bits into the space previously reserved for the adjustment value.

EXAMPLES

Illustrative examples of the technologies disclosed herein are provided below. An embodiment of the technologies may include any one or more, and any combination of, the examples described below.

Example 1 includes a computing device to cryptographically encode indirect addresses. The computing device includes a processor comprising address encoding logic to encode an indirect address during execution of a computer program and on a memory allocation operation that allocates memory and returns the indirect address, wherein the indirect address comprises a plurality of unused bits and a plurality of used bits, and wherein the used bits are to store data indicative of a memory location of the allocated memory, wherein to encode the indirect address comprises to: determine metadata associated with the indirect address, the metadata indicative of a memory access permitted by the indirect address; store the metadata in the unused bits of the indirect address; determine a portion of the indirect address to encrypt based on the metadata; encrypt the determined portion of the indirect address; and output of the encoded indirect address for use by a memory access instruction.

Example 2 includes the subject matter of Example 1, wherein the metadata comprises an upper limit on the size of the allocated memory, and the address encoding logic is to determine the upper limit on the size of the allocated memory by selection of a two's power boundary as the upper limit, and the address encoding logic is to store the exponent of the selected two's power boundary as range metadata in the unused bits of the indirect address.

Example 3 includes the subject matter of Example 1 or 2, wherein the address encoding logic is to determine the portion of the indirect address to encrypt based on the selected two's power boundary.

Example 4 includes the subject matter of any of Examples 1-3, wherein the address encoding logic is to modify the range metadata by application of an adjustment value to the two's power boundary.

Example 5 includes the subject matter of any of Examples 1-4, wherein the address encoding logic is to store the adjustment value in the unused bits of the indirect address.

Example 6 includes the subject matter of any of Examples 1-5, wherein the address encoding logic is to determine the adjustment value based on a location of a most significant bit of the used bits of the indirect address in relation to the two's power boundary.

Example 7 includes the subject matter of any of Examples 1-6, wherein the address encoding logic is to store the data indicative of the upper limit on the size of the allocated memory in the unused bits of the indirect address.

Example 8 includes the subject matter of any of Examples 1-7, wherein the determined portion of the indirect address comprises the used bits of the indirect address, and the address encoding logic is to cause the processor to encrypt the used bits of the indirect address.

Example 9 includes the subject matter of any of Examples 1-8, wherein the address encoding logic is to store the adjustment value in the unused bits of the indirect address, the determined portion of the indirect address comprises the unused bits of the indirect address in which the adjustment value is stored, and the address encoding logic is to encrypt the adjustment value stored in the unused of the indirect address and the used bits of the indirect address.

Example 10 includes the subject matter of any of any of Examples 1-9, wherein the address encoding logic is to: determine the upper limit on the buffer size by selecting a two's power boundary as the upper limit on the buffer size and applying an adjustment value to the two's power boundary, and store the exponent of the selected two's power boundary and the adjustment value in the unused bits of the indirect address.

Example 11 includes the subject matter of any of Examples 1-10, wherein the address encoding logic is to encrypt the determined portion of the indirect address by execution of a tweakable block cipher with a secret key and with the exponent of the selected two's power boundary stored in the unused bits of the indirect address as a tweak.

Example 12 includes the subject matter of any of Examples 1-11, wherein the address encoding logic is to encrypt the determined portion of the indirect address by execution of a tweakable block cipher with the adjustment value stored in the unused bits of the indirect address as a tweak.

Example 13 includes the subject matter of any of Examples 1-12, wherein the address encoding logic is to encrypt the determined portion of the indirect address by execution of a tweakable block cipher with a secret key and with a code block identifier as a tweak, wherein the code block identifier is indicative of a block of code of the computer program that is to execute the memory allocation operation.

Example 14 includes the subject matter of any of Examples 1-13, wherein the address encoding logic is to encrypt the determined portion of the indirect address by execution of a tweakable block cipher with instruction pointer data as a tweak, wherein the instruction pointer data is indicative of a block of code from which an instruction of the computer program is to execute the memory allocation operation.

Example 15 includes the subject matter of any of Examples 1-14, wherein the address encoding logic is to: encode an instruction pointer with metadata indicative of a memory access permitted by the instruction pointer and an adjustment value, and encrypt the indirect address using the encoded instruction pointer as a tweak.

Example 16 includes the subject matter of any of Examples 1-15, and includes address decoding logic to, during execution of a computer program and on a memory access operation involving memory and a register, obtain the encoded indirect address and decrypt the encrypted portion of the encoded address using the secret key and a tweak.

Example 17 includes the subject matter of any of Examples 1-16, wherein the address decoding logic is to return the decrypted address to its original form by removal of the data stored in the unused bits of the indirect address.

Example 18 includes the subject matter of any of Examples 1-17, wherein the address encoding logic is to encrypt the determined portion of the indirect address with a tweakable block cipher and the tweak used by the tweakable block cipher comprises one or more of: data stored in the unused bits of the indirect address, the upper limit on the buffer size, an exponent of a two's power boundary selected as the upper limit on the buffer size, an adjustment value applied to the two's power boundary, a code block identifier, instruction pointer data, and permission information encoded in the metadata.

An Example 19 includes a method for securing indirect addresses to mitigate buffer overflow attacks. The method includes: causing a processor to encode an indirect address during execution of a computer program and on a memory allocation operation that allocates memory for a buffer and returns an indirect address, wherein the indirect address comprising a plurality of unused bits and a plurality of used bits, and wherein the used bits to store data indicating a memory location of the buffer, wherein causing the processor to encode the indirect address comprises: determining an upper limit on the size of the buffer; storing data indicative of the upper limit on the buffer size in the unused bits of the indirect address; determining a portion of the indirect address to encrypt based on the data indicative of the upper limit on the buffer size; encrypting the determined portion of the indirect address; and outputting the encoded indirect address for use by a memory access instruction of the processor.

Example 20 includes the subject matter of Example 19, and includes determining the upper limit on the buffer size by selecting a two's power boundary as the upper limit on the buffer size, and storing the exponent of the selected two's power boundary as range metadata in the unused bits of the indirect address.

Example 21 includes the subject matter of Example 19 or 20, and includes determining the portion of the indirect address to encrypt based on the selected two's power boundary.

Example 22 includes the subject matter of any of Examples 19-21, and includes modifying the range metadata by applying an adjustment value to the two's power boundary.

Example 23 includes the subject matter of any of Examples 19-22, and includes storing the adjustment value in the unused bits of the indirect address.

Example 24 includes the subject matter of any of Examples 19-23, and includes determining the adjustment value based on a location of a most significant bit of the used bits of the indirect address in relation to the two's power boundary.

Example 25 includes the subject matter of any of Examples 19-24, and includes storing the data indicative of the upper limit on the buffer size in the unused bits of the indirect address.

Example 26 includes the subject matter of any of Examples 19-25, wherein the determined portion of the indirect address comprises the used bits of the indirect address, and the method includes encrypting the used bits of the indirect address.

Example 27 includes the subject matter of any of Examples 19-26, and includes storing the adjustment value in the unused bits of the indirect address, and wherein the determined portion of the indirect address comprises the unused bits of the indirect address in which the adjustment value is stored, encrypting the unused bits of the indirect address in which the adjustment value is stored.

Example 28 includes the subject matter of any of Examples 19-27, and includes: determining the upper limit on the buffer size by selecting a two's power boundary as the upper limit on the buffer size and applying an adjustment value to the two's power boundary, and storing the exponent of the selected two's power boundary and the adjustment value in the unused bits of the indirect address.

Example 29 includes the subject matter of any of Examples 19-28, and includes encrypting the determined portion of the indirect address with a tweakable block cipher using a secret key and using the exponent of the selected two's power boundary stored in the unused bits of the indirect address as a tweak.

Example 30 includes the subject matter of any of Examples 19-29, and includes encrypting the determined portion of the indirect address with a tweakable block cipher using the adjustment value stored in the unused bits of the indirect address as a tweak.

Example 31 includes the subject matter of any of Examples 19-30, comprising encrypting the determined portion of the indirect address with a tweakable block cipher using a secret key and using a code block identifier as part of a tweak, wherein the code block identifier is indicative of a block of code of the computer program invoking the memory allocation operation.

Example 32 includes the subject matter of any of Examples 19-31, and includes encrypting the determined portion of the indirect address with a tweakable block cipher using instruction pointer data as a tweak, wherein the instruction pointer data is indicative of a block of code from which an instruction of the computer program is executing the memory allocation operation.

Example 33 includes the subject matter of any of Examples 19-32, and includes, by the computer program, creating a new indirect address usable by other computer program code by: decoding the indirect address and encrypting the decoded indirect address using metadata indicative of range information associated with the other computer program code as a tweak.

Example 34 includes the subject matter of any of Examples 19-33, wherein the metadata indicative of range information associated with the other computer program code is indicative of a subset of memory accessible by the other computer program code.

Example 35 includes the subject matter of any of Examples 19-34, and includes, during execution of a computer program, on a memory access operation involving memory and a register, obtaining the encoded indirect address and decrypting the encrypted portion of the encoded address using the secret key and a tweak.

Example 36 includes the subject matter of any of Examples 19-35, and includes encrypting the determined portion of the indirect address with a block cipher, wherein the tweak used by the block cipher comprises one or more of: data stored in the unused bits of the indirect address, the upper limit on the buffer size, an exponent of a two's power boundary selected as the upper limit on the buffer size, an adjustment value applied to the two's power boundary, a code block identifier, and instruction pointer data.

Example 37 includes the subject matter of any of Examples 19-36, and includes returning the decrypted address to its original form by removing the data stored in the unused bits of the indirect address.

An Example 38 includes one or more non-transitory machine readable storage media including a plurality of instructions stored thereon that in response to being executed result in a computing device performing the method of any of Examples 20-37.

An Example 39 includes a computing device including means for executing the method of any of Examples 20-37.

The invention claimed is:

1. A system for cryptographically encoding indirect addresses comprising:
a processor having address encoding logic capable of encoding an indirect address, wherein the indirect address comprises a plurality of unused bits and a plurality of used bits, and wherein the used bits are indicative of a memory location, wherein to encode the indirect address comprises to:
encrypt at least a part of the indirect address;
determine metadata associated with the indirect address, the metadata indicative of a memory access permitted by the indirect address;
store at least a portion of the metadata or a derivative of at least a portion of the metadata in the unused bits of the indirect address; and
output the encoded indirect address.

2. The system of claim 1, wherein to encrypt the at least a part of the indirect address comprises to execute a tweakable block cipher with a secret key, with a tweak value, and with the least a part of the indirect address as input.

3. The system of claim 2, wherein the secret key is stored in a register of the processor.

4. The system of claim 2, wherein the tweak value comprises a pointer register value.

5. The system of claim 1, wherein to determine the metadata comprises to determine the metadata in response to encryption of the at least a part of the indirect address.

6. The system of claim 5, wherein the metadata comprises plaintext metadata indicative of a valid memory range associated with the indirect address.

7. The system of claim 1, wherein the processor further comprises address decoding logic to:
decode the encoded indirect address in response to an output of the encoded indirect address; and
access the memory location associated with the indirect address in response to decoding of the encoded indirect address.

8. The system of claim 7, wherein the address decoding logic is further to:
generate a corrupt address in response to unsuccessful decoding of the encoded indirect address; and
generate a fault in response to an access of the corrupt address.

9. A baseband processor for cryptographically encoding indirect addresses, the baseband processor comprising address encoding logic to:

encrypt at least a part of an indirect address, wherein the indirect address comprises a plurality of unused bits and a plurality of used bits, and wherein the used bits are indicative of a memory location;

determine metadata associated with the indirect address, the metadata indicative of a memory access permitted by the indirect address;

store at least a portion of the metadata or a derivative of at least a portion of the metadata in the unused bits of the indirect address; and output the encoded indirect address.

10. The baseband processor of claim 9, wherein to encrypt the at least a part of the indirect address comprises to execute a tweakable block cipher with a secret key, with a tweak value, and with the least a part of the indirect address as input.

11. The baseband processor of claim 10, wherein the secret key is stored in a register of the baseband processor.

12. The baseband processor of claim 10, wherein the tweak value comprises a pointer register value.

13. The baseband processor of claim 9, wherein to determine the metadata comprises to determine the metadata in response to encryption of the at least a part of the indirect address.

14. The baseband processor of claim 13, wherein the metadata comprises plaintext metadata indicative of a valid memory range associated with the indirect address.

15. The baseband processor of claim 9, further comprising address decoding logic to:

decode the encoded indirect address in response to an output of the encoded indirect address; and access the memory location associated with the indirect address in response to decoding of the encoded indirect address.

16. The baseband processor of claim 15, wherein the address decoding logic is further to:

generate a corrupt address in response to unsuccessful decoding of the encoded indirect address; and generate a fault in response to an access of the corrupt address.

17. One or more computer-readable storage media comprising a plurality of instructions stored thereon that, in response to being executed, cause a computing device to:

encode, by a processor of the computing device, an indirect address, wherein the indirect address comprises a plurality of unused bits and a plurality of used bits, and wherein the used bits are indicative of a memory location, wherein to encode the indirect address comprises to:

encrypt at least a part of the indirect address;

determine metadata associated with the indirect address, the metadata indicative of a memory access permitted by the indirect address;

store at least a portion of the metadata or a derivative of at least a portion of the metadata in the unused bits of the indirect address; and output the encoded indirect address.

18. The one or more computer-readable storage media of claim 17, wherein to encrypt the at least a part of the indirect address comprises to execute a tweakable block cipher with a secret key, with a tweak value, and with the least a part of the indirect address as input.

19. The one or more computer-readable storage media of claim 17, further comprising a plurality of instructions stored thereon that, in response to being executed, cause the computing device to:

decode, by the processor, the encoded indirect address in response to an output of the encoded indirect address; and access, by the processor, the memory location associated with the indirect address in response to decoding of the encoded indirect address.

20. The one or more computer-readable storage media of claim 19, further comprising a plurality of instructions stored thereon that, in response to being executed, cause the computing device to:

generate, by the processor, a corrupt address in response to unsuccessful decoding of the encoded indirect address; and generate, by the processor, a fault in response to an access of the corrupt address.

* * * * *